Patented Aug. 4, 1942

2,291,917

UNITED STATES PATENT OFFICE 2,291,917

SPALLING-RESISTANT REFRACTORY

Norman Percy Pitt, Montreal, Quebec, Arthur Clarence Halferdahl, Rockcliffe, Ontario, and Frank Eugene Lathe, Ottawa, Ontario, Canada, assignors, by mesne assignments, to Canadian Refractories Limited, Montreal, Quebec, Canada, a corporation of Canada No Drawing. Application November 6, 1939, Serial No. 303,016

9 Claims. (Cl. 106—59)

This invention relates to refractories from which spalling resistant products such as brick and furnace linings may be formed.

It is known that such products can be produced from magnesite clinker by incorporating therein relatively coarse particles of chrome ore but difficulties have been experienced in using chrome ore to impart spalling resistance to refractory clinker containing as an essential ingredient dicalcium silicate. It has been found that the serpentine or other silicate or silica component of the chrome ore upon heating collects around the outside of the particle and reacts with the surrounding dicalcium silicate, producing a compound, of relatively low refractoriness, which is absorbed by the surrounding matrix with substantial shrinkage and may leave the particles of chrome ore spinels relatively loose. Such products have low refractoriness under load owing to the presence of readily fusible constituents, are of poor appearance and have inadequate spalling resistance.

These difficulties have been overcome by definitely restricting the amount of reactive silicates or silica in the chrome ore component so that the particles of chrome ore spinels retain their identity and remain fixed in the mass and capable of imparting spalling resistance to brick or other shaped bodies formed from the mixture of calcium silicate clinker and the chrome ore.

Chrome ore consists essentially of two classes of phases, i. e. spinel phases and silica or silicate phases. In the treatment of the chrome ore with lime in suitable proportions the silica or silicate phases are changed to dicalcium silicate and periclase. The term spinels of chrome ore includes magnesium aluminate, ferrous chromite, magnesium chromite, and the like, which may be designated by $RO.R'_2O_3$ where R is Fe, Mg, Zn, Mn, and where R' is Al, Cr, ferric iron etc. In combining chrome ore or chrome ore clinker with dicalcium silicate clinker to form a refractory for brick or other shapes, it is essential that no reactions occur, on burning the brick, with the dicalcium silicate and periclase or the spinel phases of the chrome ore particles.

In accordance with the present invention there is intimately mixed with ground calcium silicate clinker, having a lime to silica ratio between 1.8 and 2.4, a portion of chrome ore component, of which the particle size is relatively coarse and in which the reactive silica does not substantially exceed 4%. If the chrome ore to be used contains more than about 4% of reactive silica it is first caused to react with lime to transform the reactive silica to a calcium silicate having a lime to silica ratio substantially the same as that of the clinker used. In this treatment, the chrome ore is preferably retained relatively coarse. This is important in retaining the identity of the particles of the chrome ore spinels to insure maximum spalling resistance in the composite refractory. However, finely divided chrome ore may be treated with lime in a similar manner and the resulting clinker crushed to provide the relatively coarse particles. These particles contain the particles of spinel originally present in the chrome ore but now in a matrix of periclase and dicalcium silicate.

In a particular case, the typical chrome ore, which contained 7.25% $SiO_2$, was crushed to pass through a screen having six meshes to the linear inch and the fines were removed on a screen having 20 meshes to the linear inch. It was then mixed with 36.2% of its weight of a siliceous limestone containing 5.8% $SiO_2$, 0.7% $Fe_2O_3$ plus $Al_2O_3$, 51.2% $CaO$, 1.3% $MgO$ and 41.0% $CO_2$, the object being to provide substantially enough lime to convert all the silica present to dicalcium silicate. The mixture was then heated at 2770° F. for a sufficient period to permit the reaction between the lime and silica to take place. Following this treatment the original particles of chrome ore were loosely adherent and in a condition to insure spalling resistance in the composite refractory.

As illustrative of the use of a low silica chrome ore not requiring the preliminary treatment the following example is given. The ore analyzed $SiO_2$ 2.6%, $Al_2O_3$ 15.9%, $Cr_2O_3$ 50.1%, $MgO$ 17.1% iron oxides determined as $Fe_2O_3$ 14.1%, $CaO$ 0.2% and ignition loss 0.8%. This ore was crushed and sized to pass through an eight mesh screen and to remain on a thirty five mesh screen and 20% of it was mixed with a finely ground stable dolomite clinker having a lime to silica ratio of 2.4.

The chrome ore component, (being the so treated chrome ore or natural chrome ore) containing less than 4% of reactive silica is broken down and sized as indicated, and not less than 3% nor more than 20% of this component is mixed with a more finely ground calcium silicate clinker having a lime to silica ratio between 1.8 and 2.4. The fine constituent of the mixture consists mainly of dicalcium silicate and periclase. The mixture is moulded into brick or other shapes, dried and burned. The chrome ore spinel grains are thoroughly bonded on all sides by the surrounding matrix but are still readily distinguishable, characteristics which have been found necessary to high spalling resistance and good refractoriness under load in refractories of this character.

When the brick are moulded by air hammer and require slicking after moulding, grain sizes of the chrome ore component should not exceed about 5 or 6 mesh. In the case of dry press brick the maximum grain size of this component may be somewhat larger, but 5 or 6 mesh sizes, as a maximum are preferred in all cases. Less than 3% of the chrome ore component will not confer increased spalling resistance over that of the straight dicalcium silicate periclase clinker and 20% gives the maximum spalling resistance. However, not more than 50% may be used if a coherent moulded brick is to be obtained. The chrome ore component should not contain over 20% of alumina or iron oxide, otherwise undesirable reactions with the dicalcium silicate clinker will occur resulting in markedly lower refractoriness in the brick.

The term reactive silica or silicate as used herein is intended to mean that which will react with lime silicates of the clinker having a lime to silica ratio of 1.8 to 2.4 to form compounds or mixtures of low melting point.

We claim:

1. A method of making refractory material for spalling resistant brick, furnace linings and the like which comprises mixing with ground calcium silicate clinker having a lime to silica ratio between 1.8 and 2.4 not less than 3 nor more than 50% of a chrome ore component, of which the particle size is relatively coarse, and in which the reactive silica does not substantially exceed 4%.

2. A method of making refractory material for spalling resistant brick, furnace linings and the like which comprises heating chrome ore, containing more than 4% of reactive silica, in relatively coarse particle size with lime to reduce the reactive silica to less than substantially 4% and mixing at least 3% and not substantially more than 20% of the product with finer particles of a calcium silicate clinker having a lime to silica ratio of between 1.8 and 2.4.

3. A refractory for the production of spalling resistant brick, furnace linings and the like consisting of ground calcium silicate clinker having a lime to silica ratio between 1.8 and 2.4 and not less than 3 nor more than 50% of chrome ore containing not substantially more than 4% of reactive silica, the particles of the chrome ore being coarser than those of the clinker.

4. A refractory for the production of spalling resistant brick, furnace linings and the like consisting of ground calcium silicate clinker having a lime to silica ratio between 1.8 and 2.4 and not less than 3% nor substantially more than 20% of chrome ore containing not substantially more than 4% of reactive silica, the particles of the chrome ore being coarser than those of the clinker.

5. A refractory for the production of spalling resistant brick, furnace linings and the like comprising as essential constituents a clinker consisting essentially of dicalcium silicate and periclase and not less than 3 nor more than 50% of a chrome ore component containing not more than 4% of reactive silica, the particles of the chrome ore component being coarser than those of the clinker.

6. A refractory for the production of spalling resistant brick, furnace linings and the like consisting essentially of dicalcium silicate, periclase and not less than 3% nor more than substantially 20% of chrome ore spinels, the spinels being substantially free from silica in a form which will react with dicalcium silicate, and the particles of said spinels being coarser than those of the dicalcium silicate and periclase.

7. A refractory for the production of spalling resistant brick, furnace linings and the like consisting of a matrix of ground dicalcium silicate and periclase and uniformly incorporated therein not less than 3% nor more than 20% of discrete relatively coarse particles of chrome ore spinels containing less than 4% of reactive silica.

8. A refractory for the production of spalling resistant brick, furnace linings and the like consisting essentially of a dicalcium silicate-containing clinker and not less than 3 nor more than 50% of a chrome ore component containing not more than 4% of reactive silica, the particles of the chrome ore component being coarser than those of said clinker.

9. A refractory for the production of spalling resistant brick, furnace linings and the like consisting essentially of dicalcium silicate-containing clinker including periclase, and a chrome ore component containing not more than substantially 4% of reactive silica, the particles of the chrome ore component being coarser than those of the said clinker and the chrome ore component constituting not less than 3 nor more than 50% of the mass.

NORMAN PERCY PITT.
ARTHUR CLARENCE HALFERDAHL.
FRANK EUGENE LATHE.